Dec. 25, 1934.  W. H. TAYLOR  1,985,527
HEIGHT MEASURING ROD FOR SCALES
Filed May 12, 1933  3 Sheets-Sheet 1

INVENTOR
WILLIAM H. TAYLOR
BY
ATTORNEY

Dec. 25, 1934.   W. H. TAYLOR   1,985,527
HEIGHT MEASURING ROD FOR SCALES
Filed May 12, 1933   3 Sheets-Sheet 2
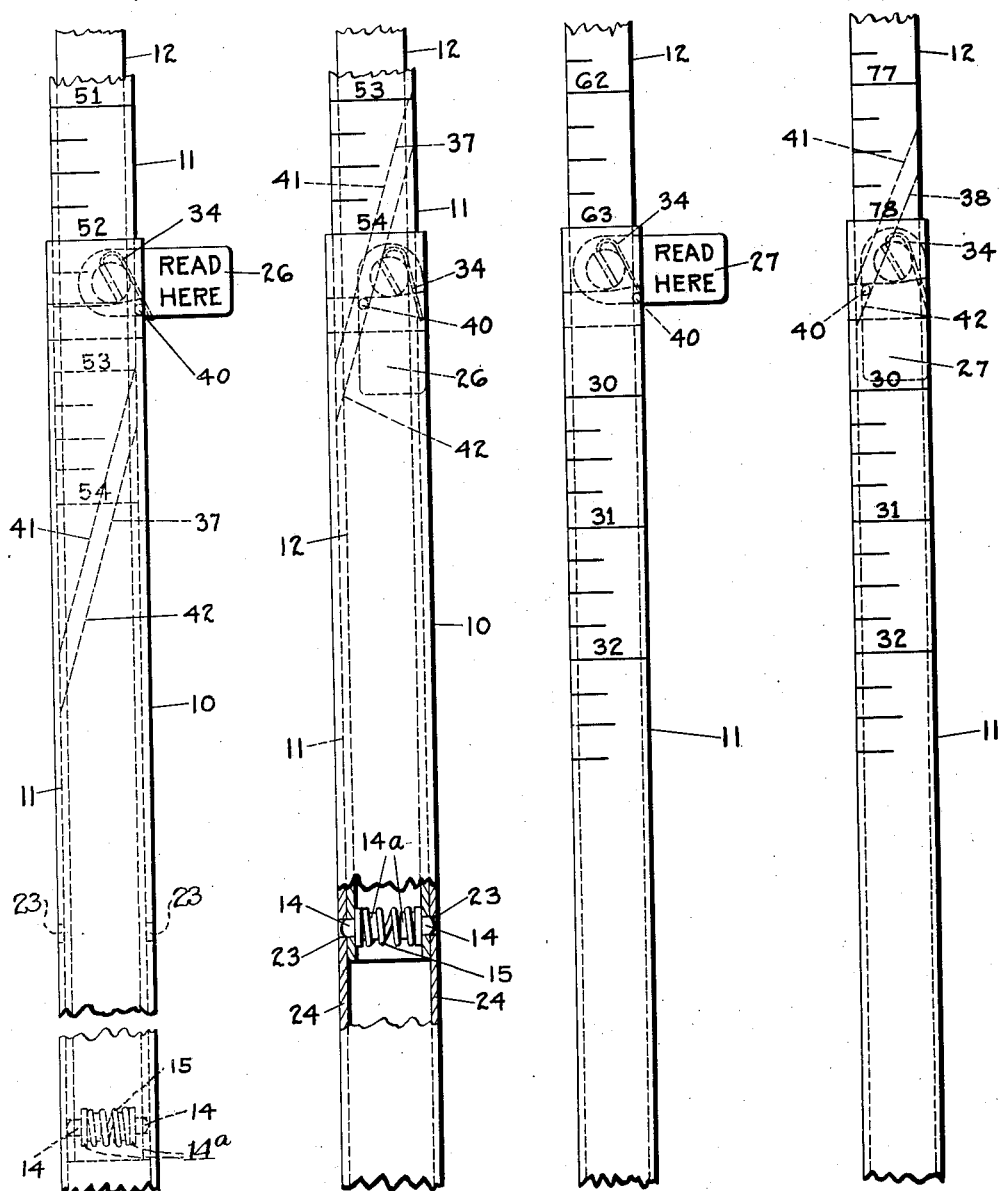
INVENTOR
WILLIAM H. TAYLOR
BY
ATTORNEY Dec. 25, 1934.  W. H. TAYLOR  1,985,527
HEIGHT MEASURING ROD FOR SCALES
Filed May 12, 1933  3 Sheets-Sheet 3
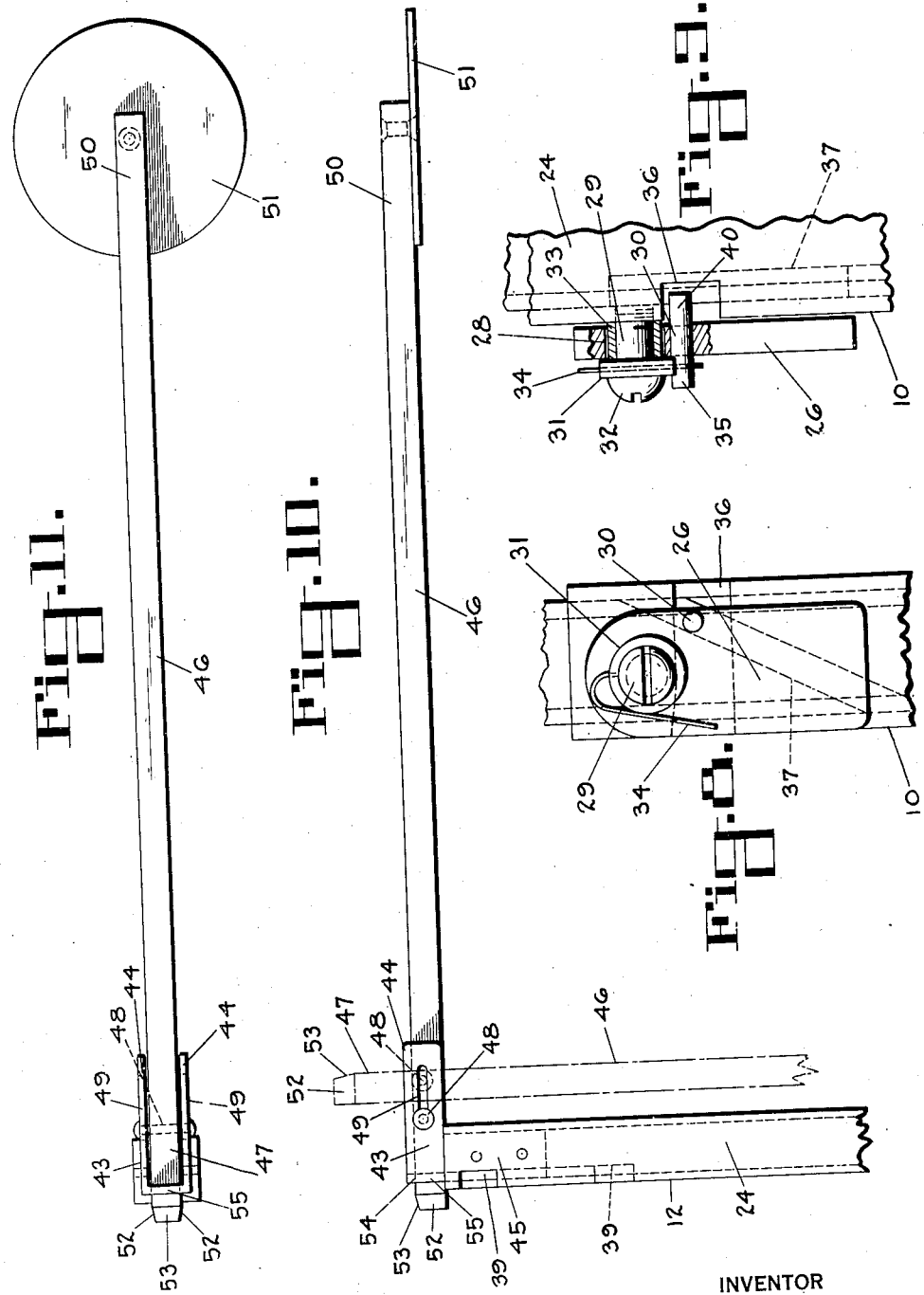
INVENTOR
WILLIAM H. TAYLOR
BY
ATTORNEY Patented Dec. 25, 1934

1,985,527

UNITED STATES PATENT OFFICE 1,985,527

HEIGHT MEASURING ROD FOR SCALES

William H. Taylor, St. Johnsbury, Vt., assignor to E. and T. Fairbanks and Company, St. Johnsbury, Vt., a corporation of Vermont Application May 12, 1933, Serial No. 670,629

18 Claims. (Cl. 33—169)

This invention relates to improvements in height measuring rods for weighing scales, particularly to rods adapted to be attached to scales of the personal weigher type.

In such devices it is a desirable feature to provide a rod of compact construction and capable of being readily adjusted from the minimum to the maximum range of height indications thereon, together with ready means to indicate to the operator the precise point at which to note the particular height measurement registered by the rod.

Therefore, in order to obtain these advantages one of the principal objects of the invention is to provide an adjustable measuring rod comprising a plurality of interfitting, telescopic sections carrying height indications thereon and adapted to always indicate at a fixed point the height measurements registered by a given section of the rod.

Another important object is to provide an automatically operated height indicator for each rod measuring section adapted to be moved out laterally of the rod when the measuring section is drawn out to its operative position and to indicate the point on the measuring rod section where the height indication is to be read.

Another object is to provide spring actuated contact means for holding each rod measuring section in constant sliding contact with its co-operating rod section and adapted to hold it at the registered height indication, when the rod measuring section has been adjusted to that position.

Another object is to provide the middle and inner rod sections with means for automatically operating and then closing or retracting the co-operating height indicator to its inoperative position as the particular rod section is respectively drawn out to its operative position and subsequently returned to its inoperative position.

Another object is to provide each height indicator with resilient means adapted to co-act with a transverse pin, carried by the indicator, in maintaining the indicator constantly in its operative or horizontal position by holding the pin in sliding contact with the wall of the co-operating measuring section while in its operative position and the resilient means being further adapted to urge the height indicator back to its inoperative or vertical position.

Another object is to provide the outer rod section with means co-operating with the spring actuating means of the middle rod section in holding the middle rod section securely in a fixed position when it has been fully extended and thus prevent it from being withdrawn from the co-operating outer rod section.

Another object is to provide means to prevent the inner rod section from being withdrawn from the middle rod section when it has reached its maximum height indication.

Still another object is to provide the tip end of the inner rod measuring section with a swivelly mounted head contacting disc arm and disc provided with adjustable means for locking the arm in its operative position and for unlocking it in returning it to its inoperative position.

With the foregoing and other objects in view my invention consists in certain novel features of construction, a preferred embodiment of which is illustrated in the accompanying drawings, in which,—

Figures 1, 2, 3:
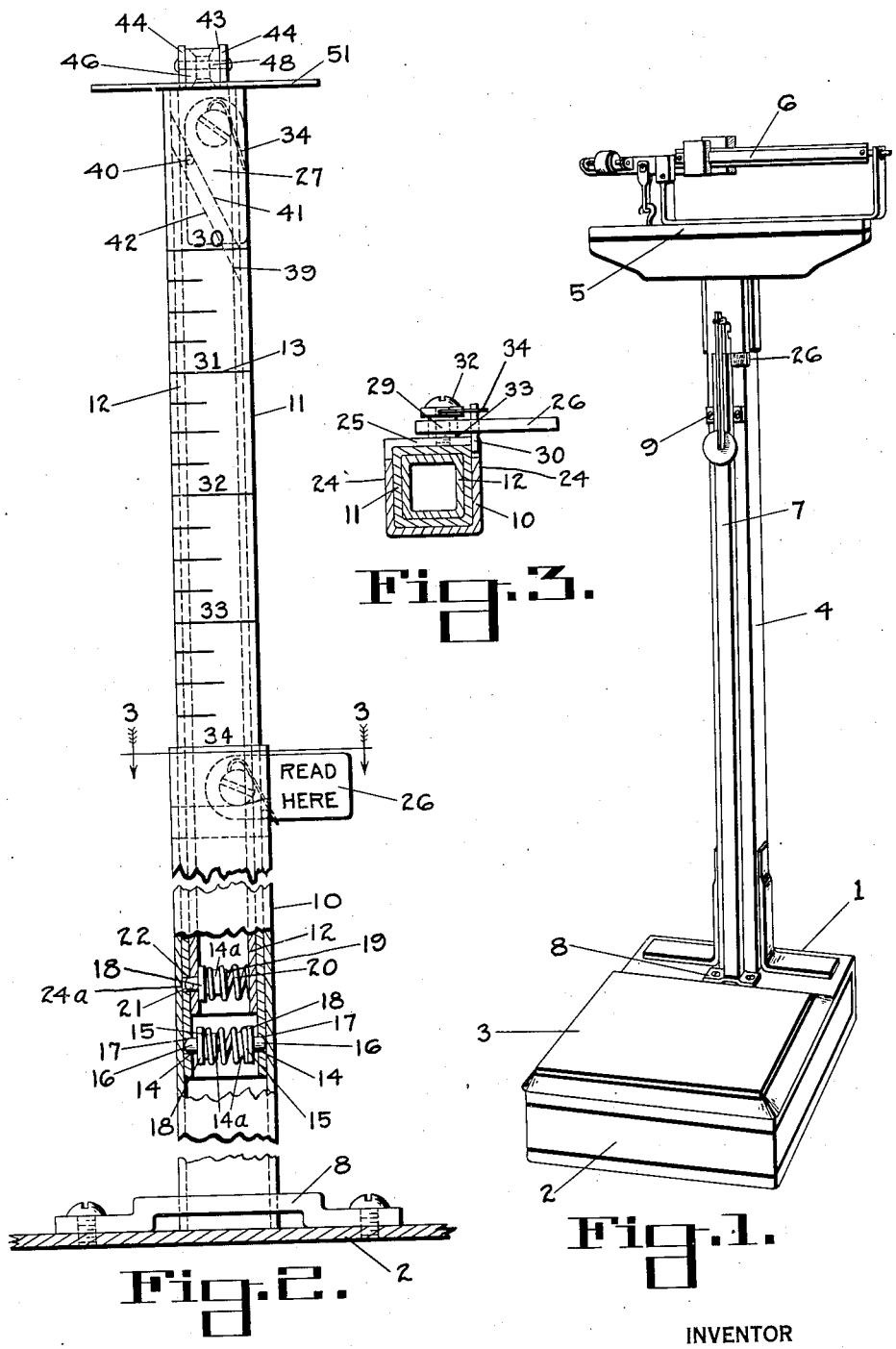
Figure 1 is a perspective view of a weighing scale showing a preferred form of my improved height measuring rod mounted thereon.
Figure 2 is a front elevation, partly in section, showing the three telescopic, interfitting rod sections comprising the measuring rod in their co-operative relation, and the control slot in the inner rod section operating the height reading indicator.
Figure 3 is a cross-section on the line 3—3 of Figure 2, showing the co-operating rod sections and the height reading indicator carried by the outer rod.

Figures 4 and 5 are vertical elevations, partly in section, showing the co-operating rod sections, and particularly the inclined control slot operating the height reading indicator for the middle rod section, illustrated in Figure 4 in its open position at a registered height indication on the middle rod section, and in Figure 5 in its closed position at the maximum height indication of the middle rod section.

Figures 6 and 7 are similar vertical elevations showing the co-operating middle and inner rod sections with the inclined control slot shown in Figure 7 for operating the height reading indicator for the inner rod section, shown in Figure 6 in its open position at a registered height indication thereon and in Figure 7 in its closed position at the maximum height indication of the inner rod section.

Figure 8 is an enlarged vertical elevation of one of the height reading indicators and co-operating parts.

Figure 9 is an enlarged side view, partly in section, of the height reading indicator illustrated in Figure 8.

Figure 10 is a side elevation and Figure 11 a plan, showing the head contacting arm and head contact disc in operative position.

Referring to the drawings 1 designates a platform scale consisting essentially of a base 2, a platform 3 mounted thereon, and an upright standard or pillar 4 having mounted on the upper end a shelf 5 carrying a weigh beam 6. Vertically mounted in front of the pillar 4 is a measuring rod 7 secured in a base plate 8 at the rear of the base 2 and attached to the pillar by a spacer bracket 9, which in conjunction with the base plate 8 holds the rod 7 in spaced relation to the pillar 4. The measuring rod comprises three pressed sheet metal interfitting hollow telescopic sections, 10, 11 and 12, preferably rectangular in section, the outer or holder section 10 being fixedly secured to the base plate 8 and bracket 9, while the middle and inner sections 11 and 12 constitute height measuring sections, carrying height indications or measurements 13 impressed therein and being adapted to slide within the outer section 10 and middle section 11 respectively. The range of height indications marked on the outer wall of the middle rod section 11 is from 30 to 54 inches and on the inner rod section from 54 to 78 inches, which provides the widest practical height measuring range, (Figs. 4 to 7).

For the purpose of performing the double function of temporarily holding the middle rod section 11 and inner section 12 at their registered height indications as well as to hold them in a fixed position when they have been drawn out to the maximum height indication on each rod section, the middle section 11 is provided at its lower end on the inside with transversely disposed and aligned stop pins 14, comprising a shank 14a inserted in an expanded spiral spring 15 and a rounded nose portion 16 (Fig. 2), each pin 14 protruding through a circular opening 17 in and slightly beyond the wall of the middle section 11 and provided also with an annular flange 18 adjacent to the nose portion, adapted to engage the inner surface of the wall and thus retain the pin 14 in position. A similar single stop pin 19 is located at the lower end of the inner rod section 12 and is likewise mounted on an expanded spiral spring 20 within the inner section (Fig. 2) and has its nose portion 21 protruding slightly through a circular opening 22 in one side wall only of the inner section 12. By this arrangement the protruding pins 14 and 19 are held in frictional engagement with and are thus maintained in constant sliding contact with the inner opposed walls of the outer section 10 and middle section 11 respectively and thereby aid in holding each section 11 and 12 at any height indication 13 to which it may be adjusted. Then when the middle section 11 has been extended to its maximum height indication the stop pins 14 are adapted to engage circular opposed openings 23 in the opposed side walls 24 of the outer section 10 adjacent to its upper end (Fig. 5) and thus hold securely the middle section 11 in a fixed position. Moreover, the inner section 12 is held in a fixed position when drawn out to its maximum height indication by means hereinafter described.

In order to provide ready means for indicating the exact reading point for the registered height indication there is located at the upper ends of the outer rod section 10 and middle section 11 on the rear wall 25 (Fig. 3) a height reading indicator 26 on the outer section 10 and a similar indicator 27 on the middle section 11. The indicators 26 and 27, which have impressed thereon a directional indication such as "Read Here" are adapted to co-operate with the height indications on the middle section 11 and inner section 12 respectively, in indicating the height measurement registered by the particular section, and each indicator is provided at its upper end with a circular opening 28 (Figs. 8 and 9), by which the indicator is pivotally mounted on a screw stud 29 inserted in the rear wall 25. Adjacent to the opening 28 and stud 29 of each height indicator 26 and 27, a pin 30 is transversely mounted therein near the lower edge and extends outwardly from each side of the indicator, while a clamping washer 31, mounted on the stud 29 (Fig. 9) is forced by the head 32 of the stud to engage and clamp in a fixed position a spacer washer 33, which is likewise mounted on the stud 29 in the opening 28 and serves as a pivot for the indicator, while the spacer washer 33 being slightly wider than the indicator permits the indicator to swing readily without binding (Figs. 3, 8 and 9), and to move freely in the space between the pillar 4 and the rod section.

Inserted in the edge of the washer 31 is a fixed wire spring 34, looped shaped and extending downwardly, (Fig. 8) with its free end adapted in its operative position to engage the outer arm 35 of the pin 30 and to thus urge the indicator to its closed or inoperative position, as shown in Figs. 5 and 7. Below the pin 30 there is provided a cut out portion 36 in the rear end wall 25 and side walls 24 of the outer section 10 and middle section 11 in which cut out portion 36 the pin 30 is permitted to freely swing.

In order to provide efficient means for automatically opening and closing the height indicators 26 and 27 there is provided in the rear wall 25 and side walls 24 of the middle section 11 and inner section 12 (Figs. 2, 4, 5 and 7) adjacent to the lower end of each section, an inclined control slot or guide-way 37 and 38 respectively, which are both inclined to the right, while the upper end of the inner section 12 is provided with a similar control slot 39 inclined to the left. By thus inclining the control slots the order of opening or closing the indicators 26 and 27 is governed as will hereinafter be made evident. Normally the indicator 26 carried by the outer section 10 is held in its open or operative position when the rod sections are all closed (Fig. 1) and also while the middle section 11 is being used for taking height measurements (Figs. 2 and 4) and is only closed when the maximum height indication of 54 inches on the middle section 11 has been reached (Fig. 5) and the inner section 12 is drawn into operative position for higher measurements. The indicator 27 is opened by the control slot 39 in the upper end of the inner section 12 as it is drawn out into operative position and is closed thereby when the inner section 12 is pushed back to its closed position. The opening and closing of the indicators 26 and 27 is effected by the co-operation of the control slots and the inner arm 40 of the pin 30. Thus in opening the indicator 26 as the control slot 37 of the middle section 11 is pushed down from its maximum height indication (Fig. 5), the inner arm 40 of the pin 30 engages the upper edge 41 of the control slot 37 (Fig. 4) and is caused thereby to turn thereon as the control slot 37 moves downwardly, guiding the arm 40 along the upper edge 41 out of the slot and consequently swinging the indicator 26 to its horizontal operative position. (Fig. 2.) The indicator 27 carried by the middle section 11 is opened in the same way by the control slot 39 of the inner section 12 (Fig. 2) except that the slot being inclined in the opposite direction, the inner arm 40 of the pin 30 engages the lower edge 42 of the control slot 39 as the inner section 12 is drawn out and the indicator 27 is swung to its operative position. (Fig. 6.) As each indicator 26 and 27 is swung into its operative position (Figs. 2, 4 and 6) simultaneously the outer arm 35 of the pin, as the inner arm 40 slides along the co-operating control slot, is brought into engagement with the depending wire spring 34 and finally the inner arm 40 is directed from the control slot to engage the outer surface of the side wall 24, with which the inner arm 40 is maintained in constant sliding contact by the spring 34 while the rod section is being adjusted to register the proper height indication. The indicator is thus maintained constantly in its horizontal operative position while the rod section is being utilized for taking height measurements. In closing the indicators 26 and 27, after the height measurement has been taken, the rod measuring sections used are pushed down into their co-operative sections (Figs. 1 and 3), and at the same time the indicator is automatically closed by the operation of the pin 30, the inner arm 40 of which slides from its open position (Figs. 2 and 6) into the inclined control slot and engages in the case of the indicator 26 the lower edge 42 of the slot and in the case of the indicator 27 the upper edge of the slot 41, sliding along thereon and thereby turning the particular indicator to its inoperative position (Figs. 2, 5 and 7). Since the lower control slot 38 of the inner rod section 12 (Fig. 7) is located at the maximum height indication of 78 inches rarely reached it would, therefore, only function when that point has been reached and it then serves to lock the inner section 12 and prevents it from being drawn out of the middle section 11. It is to be noted that the inner arms 40 of the pins 30 carried by the indicators 26 and 27 by engaging respectively the lower edge 42 of the co-operating control slots 37 and 38 and the upper edge 41 of the control slot 39, serve to hold and prevent the rod sections from being pulled apart when they are drawn out.

Located at the tip end of the inner rod section 12 is a horizontal head contacting disc arm bracket 43, U-shaped in plan and provided with two spaced forwardly extending side arms 44 and two depending spaced attaching arms 45 adapted to be secured to the upper ends of the side walls 24 of the rod section 12. Mounted between the side arms 44 of the bracket 43 is a head contacting disc arm 46 provided adjacent to its inner end 47 with a transversely disposed pivot pin 48, which is slidably and pivotally mounted in opposed elongated slots 49 in the side arms 44, while its free outer end 50 is provided with a contact disc 51 adapted to contact with the crown of the head of a person using the measuring rod to determine his height. The inner end 47 of the head contacting arm 46 has tapered sides 52 and top 53 and is adapted when placed in its operative position, to slide into a rectangular opening 54 in the rear wall 55 of the bracket 43, and thus be held and locked securely in a horizontal position (Figs. 10 and 11). In adjusting the contacting arm 46 to its operative position (Figs. 2 and 10) it is raised from its inoperative or vertical position (Fig. 1), turned upwardly on the transverse pivot pin 48 and its inner end 47 is then pushed into the bracket opening 54, the pivot pin 48 sliding in the opposed slots 49, and thus the arm 46 is locked in its operative or horizontal position. When adjusting the head contacting disc arm 46 to its inoperative position (Fig. 1) it is pulled out from engagement with the edges of the opening 54, the ends of the transverse pivot pin 48 sliding in the opposed slots 49 of the side arms 44 and serving as pivots as the arm 46 is turned to its vertical or inoperative position, as shown in Fig. 1. In operating the height measuring rod the head contacting disc arm 51 is first adjusted by the operator to its operative or horizontal position, then the middle section 11 and inner section 12 are drawn out while the contact arm 51 is being pushed upward. In drawing out the middle and inner rod sections they move together, since the pin 19 holds them together until extended to the desired operative position and each section properly adjusted to bring the contact disc 51 into contact with the crown of the operator's head. Just as the middle section 11 and inner section 12 are drawn into operative position the indicator 26 or 27 operated by each, as hereinbefore described, is automatically brought into position to indicate the height registered by the co-operating rod section, each indicator 26 and 27 remaining in operative position until the rod section is drawn out to its maximum height indication, when the indicator is automatically closed and the respective middle rod section 11 is then held locked in a fixed position by the opposed stop pins 15 and the inner section 12 is held at its maximum height indication by the slot 38 in the lower end of the inner section 11 co-operating with the indicator pin 40 of the middle section. When it is desired to close the height measuring rod the middle section 11 and inner section 12 are pushed down and telescoped within each other and the outer section 10, as shown in Fig. 3, and the head contacting disc arm 46 turned to its inoperative or vertical position. It is evident that while the measuring rod is best adapted for use with a weighing scale, it may be used as an independent height measuring device and attached to the floor, wall or other supporting structure.

While the form of the invention herein shown constitutes a preferred embodiment thereof I do not desire to limit the invention to the exact form of construction shown and described, for it is evident that modifications may be made that will come within the scope of the invention.

I claim:—

1. A height measuring rod comprising a plurality of hollow, telescopic, interfitting measuring rod sections provided with height measuring indications, the middle and inner rod sections each having an inclined slot therein, pivotally mounted indicators carrying a directional indication and adapted to co-operate with the said height indications to indicate at a fixed position the proper reading point for the height indication registered by the co-operating rod section and means for automatically operating the indicators comprising a transversely mounted pin carried by each indicator and adapted to be engaged by the co-operating inclined slot so as to move the indicator to its open and closed position alternately.

2. A height measuring rod comprising a plurality of hollow, telescopic, interfitting rod sections, including measuring rod sections, and height reading indicators for the measuring rod sections, each indicator being pivotally mounted at the upper end of the preceding rod section.

3. A height measuring rod comprising a plurality of hollow, telescopic, interfitting rod sections, including measuring rod sections, and height reading indicators for the measuring rod sections, each indicator being provided at its upper end with a circular opening in which is inserted a screw stud secured in the rear wall of the preceding rod section, whereby the indicator is pivotally mounted thereon.

4. A height measuring rod comprising a plurality of hollow, telescopic, interfitting rod sections, including measuring rod sections, and height reading indicators for the measuring rod sections, each indicator being provided at its upper end with a circular opening in which is inserted a spacer washer mounted on a screw stud attached to the rear wall of the preceding rod section, the said spacer washer being slightly wider than the indicator and serving as a bearing on the stud for the indicator.

5. A height measuring rod comprising a plurality of hollow, telescopic, interfitting rod sections, including measuring rod sections, and height reading indicators for the measuring rod sections, each indicator being provided at its upper end with a circular opening in which is inserted a spacer washer mounted on a screw stud attached to the rear wall of the preceding rod section, and a clamping washer mounted on the stud between the spacer washer and the head of the stud, the said clamping washer being forced by the stud head firmly against the spacer washer, whereby both washers are held in a fixed position.

6. A height measuring rod comprising a plurality of hollow, telescopic, interfitting rod sections including measuring rod sections, and height reading indicators for the measuring rod sections, each indicator being pivotally mounted on a screw stud secured to the upper end of the preceding rod section.

7. A height measuring rod comprising a plurality of hollow, telescopic, interfitting rod sections, including measuring rod sections, height reading indicators for the measuring rod sections, each indicator being pivotally mounted on a spacer washer carried by a screw stud secured to the upper end of the preceding rod section, a clamping washer mounted on the said stud above the spacer washer and adapted to fixedly clamp the spacer washer in position, and a looped depending spring wire secured in the periphery of the said clamping washer and held thereby in a fixed position.

8. A height measuring rod comprising a plurality of hollow, telescopic, interfitting rod sections, including measuring rod sections, height reading indicators for the measuring rod sections, each indicator being pivotally mounted on a spacer washer carried by a screw stud secured to the upper end of the preceding rod section, a clamping washer mounted on the said stud above the spacer washer and adapted to fixedly clamp the spacer washer in position, a looped depending spring wire secured in the periphery of the said clamping washer and held thereby in a fixed position, and a transverse pin mounted in the indicator near the side edge opposite the wire spring, the said pin comprising an outer arm adapted in its operative position to engage the wire spring and an inner arm extending within the wall of the preceding rod section and adapted in operation to swing laterally in a transverse cut out portion in the rear and side walls of the preceding rod section.

9. A height measuring rod comprising a plurality of hollow, telescopic, interfitting rod sections including an outer or holder section for all the rod sections, and measuring rod sections co-operating therewith, height reading indicators for the said measuring rod sections, each indicator being pivotally mounted at the upper end of the rear wall of the preceding rod section, and means for automatically moving each indicator to its open or operative position and returning it to its closed or inoperative position.

10. A height measuring rod comprising a plurality of hollow, telescopic, interfitting rod sections including an outer or holder section for all the rod sections, and measuring rod sections co-operating therewith, height reading indicators for the said measuring rod sections, each indicator being pivotally mounted at the upper end of the rear wall of the preceding rod section, and means for automatically moving each indicator to its open or operative position and returning it to its closed or inoperative position, the said means including a pin transversely mounted in each indicator, the inner arm being adapted to alternately engage the edges of an inclined control slot in the rear wall of the preceding rod section adjacent to its lower end and to be turned along one edge of the said slot, thereby swinging the indicator to its open or operative position, the inner arm subsequently being adapted to engage and to be turned along the opposite edge of the control slot in swinging back the indicator to its closed or inoperative position.

11. A height measuring rod comprising a plurality of hollow, telescopic, interfitting rod sections including an outer or holder section for all the rod sections, and measuring rod sections co-operating therewith, height reading indicators for the said measuring rod sections, each indicator being pivotally mounted at the upper end of the rear wall of the preceding rod section, and means for automatically moving each indicator to its open or operative position and returning it to its closed or inoperative position, the said means including a pin transversely mounted in each indicator, the inner arm being adapted to alternately engage the edges of an inclined control slot in the rear wall of the preceding rod section adjacent to its lower end and to be turned along one edge of the said slot, thereby swinging the indicator to its open or operative position and simultaneously guiding the inner arm out of the control slot to slidably contact with the side wall of the preceding rod section during the adjustment of the measuring rod section and thus maintaining the indicator in its horizontal operative position.

12. A height measuring rod comprising a plurality of hollow, telescopic, interfitting rod sections including an outer or holder section for all the rod sections, and measuring rod sections co-operating therewith, height reading indicators for the said measuring rod sections, each indicator being pivotally mounted at the upper end of the rear wall of the preceding rod section, and means for automatically moving each indicator to its open or operative position and returning it to its closed or inoperative position, the said means including a pin transversely mounted in each indicator, the inner arm being adapted to alternately engage the edges of an inclined control slot in the rear wall of the preceding rod section adjacent to its lower end and to be turned along one edge of the said slot, thereby swinging the indicator to its open or operative position, the upper end of the inner measuring rod section being provided with a similar control slot inclined in the opposite direction to the said control slots of the other rod sections and adapted to control the opening and closing of the indicator carried by the preceding rod section.

13. A height measuring rod comprising a plurality of hollow, telescopic, interfitting rod sections including an outer or holder section for all the rod sections, and measuring rod sections co-operating therewith, height reading indicators for the said measuring rod sections, each indicator being pivotally mounted at the upper end of the rear wall of the preceding rod section, and means for automatically moving each indicator to its open or operative position and returning it to its closed or inoperative position, the said means including a pin transversely mounted in each indicator, a depending spring wire disposed opposite to the said pin and fixedly mounted on a pivot screw stud carrying the said indicator, the inner arm of the pin being adapted to alternately engage the edges of an inclined control slot in the rear wall of the preceding rod section adjacent to its lower end and to be turned along one edge of the said slot, the outer arm of the said pin being simultaneously brought into engagement with the depending spring wire, as the inner arm moves out of the control slot to engage the side wall of the preceding rod section, and under influence of the said spring wire on the outer arm, the inner arm of the pin is adapted to be pressed into sliding contact with the said side wall during the entire adjustment of the measuring rod section, thereby holding the indicator constantly in its horizontal operative position, the said spring wire subsequently pressing the outer arm and causing the inner arm to reenter the control slot, thus swinging the indicator back to its inoperative position.

14. In a height measuring rod, a plurality of hollow, telescopic, interfitting and adjustable rod sections, and an adjustable arm pivotally mounted on the upper end of the inner rod section, carrying at its outer end a head contact disc, and provided at its inner end with a transversely extending pivot pin adapted to engage and slide in opposed elongated slots in the lateral arms of a bracket secured to the upper end of the inner rod section, and means for holding and locking the said adjustable arm in its horizontal operative position including beveled upper and side portions at the inner end of the said arm, adapted to enter and guide the inner end of the arm into a rectangular opening in the rear wall of the said bracket.

15. A height measuring rod comprising a plurality of hollow, telescopic, interfitting rod sections, including measuring rod sections, a height reading indicator pivotally mounted on each preceding measuring rod section for up and down movement and co-operating means carried by the said measuring rod sections adapted to control the raising and lowering of the said indicators at predetermined degrees of extension of the said rod sections.

16. A height measuring rod comprising a plurality of hollow, telescopic, interfitting measuring rod sections, including an outer rod section, a middle section and an inner section, the said middle and inner sections each carrying height indicators and having inclined slotted means therein, pivotally mounted indicators provided with a directional indicator to indicate at a fixed position the proper reading point for the height indication registered by the cooperating rod section, and means carried by each indicator co-operating with the said slotted means in automatically raising and lowering the indicator.

17. A height measuring rod comprising a plurality of hollow, telescopic, interfitting rod sections, including measuring rod sections, movable height reading indicators for the measuring rod sections, slotted means in the wall of each measuring rod section adapted to control the raising and lowering of the said indicators at predetermined times, and transversely disposed means in the said indicators adapted to co-operate with the said slotted means in effecting the movement of the said indicators.

18. A height measuring rod comprising a plurality of hollow, telescopic, interfitting rod sections, including measuring rod sections, movable height reading indicators for the measuring rod sections, diagonally disposed slots in the said measuring rod sections adapted to control the raising and lowering of the said indicators at predetermined times, and a pin carried by each indicator adapted to cooperate with the said diagonal slot of the co-operating measuring rod section in effecting the movement of the co-operating indicator.

WILLIAM H. TAYLOR.